US012730697B2

(12) United States Patent
Ganapathy Achari et al.

(10) Patent No.: US 12,730,697 B2
(45) Date of Patent: Sep. 8, 2026

(54) SECURE TARGET DEVICE ACCESS

(71) Applicant: Arista Networks, Inc., Santa Clara, CA (US)

(72) Inventors: Rajesh Kumar Ganapathy Achari, Perumbavoor (IN); Anoop Kumaran Nair, Thrikkakara (IN); Madhusudhan Chitradurga Sethuram Setty, Bengaluru (IN); Rajarao Bhagya Prasad Nittur, Milpitas, CA (US); Krishna Prabhakar, Los Altos Hills, CA (US); Anubhav Gupta, Navi Mumbai (IN)

(73) Assignee: Arista Networks, Inc., Santa Clara, CA (US)

( * ) Notice: Subject to any disclaimer, the term of this patent is extended or adjusted under 35 U.S.C. 154(b) by 208 days.

(21) Appl. No.: 18/524,392

(22) Filed: Nov. 30, 2023

(65) Prior Publication Data

US 2024/0414152 A1 Dec. 12, 2024

(30) Foreign Application Priority Data

Jun. 12, 2023 (IN) ............................ 202341039926

(51) Int. Cl.
*H04L 9/40* (2022.01)
*G06F 11/07* (2006.01)
(Continued)

(52) U.S. Cl.
CPC ........ *G06F 11/0709* (2013.01); *G06F 11/079* (2013.01); *G06F 11/0793* (2013.01); *G06F 11/2257* (2013.01); *G06F 16/242* (2019.01); *G06F 16/245* (2019.01); *G06F 40/295* (2020.01); *G06F 40/40* (2020.01);
(Continued)

(58) Field of Classification Search
CPC ............... G06F 11/0709; G06F 11/079; G06F 11/0793; G06F 11/2257; G06F 16/242; G06F 16/245; G06F 40/295; G06F 40/40; G06N 5/022; H04L 9/0825; H04L 41/0893; H04L 41/0894; H04L 41/0895; H04L 41/145; H04L 41/149
See application file for complete search history.

(56) References Cited

U.S. PATENT DOCUMENTS

2014/0129457 A1* 5/2014 Peeler .................. G06Q 30/018
705/317
2018/0026984 A1* 1/2018 Maker .................. H04L 63/102
726/4

(Continued)

OTHER PUBLICATIONS

T. Ylonen et al., The Secure Shell (SSH) Transport Layer Protocol, SSH Transport Layer Protocol, Jan. 2006, pp. 1-32, The Internet Society.

(Continued)

*Primary Examiner* — Khoi V Le
(74) *Attorney, Agent, or Firm* — Treyz Law Group, P.C.; Tianyi He

(57) ABSTRACT

A device access management server may facilitate secure remote access of a target device by an accessing device. The secure remote access of the target device by the accessing device may be authenticated using a session token. The device access management server may maintain the session token and other session information.

19 Claims, 10 Drawing Sheets

(51) Int. Cl.

| | |
|---|---|
| ***G06F 11/22*** | (2006.01) |
| ***G06F 16/242*** | (2019.01) |
| ***G06F 16/245*** | (2019.01) |
| ***G06F 40/295*** | (2020.01) |
| ***G06F 40/40*** | (2020.01) |
| ***G06N 5/022*** | (2023.01) |
| ***H04L 9/08*** | (2006.01) |
| ***H04L 41/0806*** | (2022.01) |
| ***H04L 41/0893*** | (2022.01) |
| ***H04L 41/0894*** | (2022.01) |
| ***H04L 41/0895*** | (2022.01) |
| ***H04L 41/14*** | (2022.01) |
| ***H04L 41/149*** | (2022.01) |
| ***H04L 41/28*** | (2022.01) |
| ***H04L 43/0876*** | (2022.01) |

(52) U.S. Cl.

CPC ........... *G06N 5/022* (2013.01); *H04L 9/0825* (2013.01); *H04L 41/0806* (2013.01); *H04L 41/0893* (2013.01); *H04L 41/0894* (2022.05); *H04L 41/0895* (2022.05); *H04L 41/145* (2013.01); *H04L 41/149* (2022.05); *H04L 41/28* (2013.01); *H04L 43/0876* (2013.01); *H04L 63/0823* (2013.01); *H04L 63/083* (2013.01); *H04L 63/0876* (2013.01); *H04L 63/10* (2013.01); *H04L 63/102* (2013.01)

(56) References Cited

U.S. PATENT DOCUMENTS

| | | | | |
|---|---|---|---|---|
| 2019/0357076 | A1* | 11/2019 | Han .................. | H04W 28/0268 |
| 2020/0120068 | A1* | 4/2020 | Senftleber .............. | G06Q 50/01 |
| 2021/0014216 | A1* | 1/2021 | Ford ....................... | H04L 9/321 |
| 2021/0320918 | A1* | 10/2021 | Mars ..................... | H04W 12/68 |
| 2023/0171257 | A1* | 6/2023 | Ramaswamy ...... | H04L 63/0884 726/4 |
| 2024/0378107 | A1* | 11/2024 | Merchant ............ | G06F 11/3089 |

OTHER PUBLICATIONS

C. Rigney et al., Remote Authentication Dial In User Service (RADIUS), Radius, Jun. 2000, pp. 1-76, The Internet Society.

* cited by examiner

SECURE TARGET DEVICE ACCESS

This application claims the benefit of Indian Provisional Patent Application No. 202341039926, filed Jun. 12, 2023, which is hereby incorporated by reference herein in its entirety.

BACKGROUND

This relates to a communication system, and more particularly, to computing equipment configured to facilitate secure access of a remote target device by an accessing device.

In one illustrative communication system, a network can include network devices that convey network traffic between hosts. It may be desirable for a user such as a network administrator operating a computing device to remotely access one or more of the network devices in the network in a secure manner, e.g., to perform device administration.

DETAILED DESCRIPTION

Figure 1:
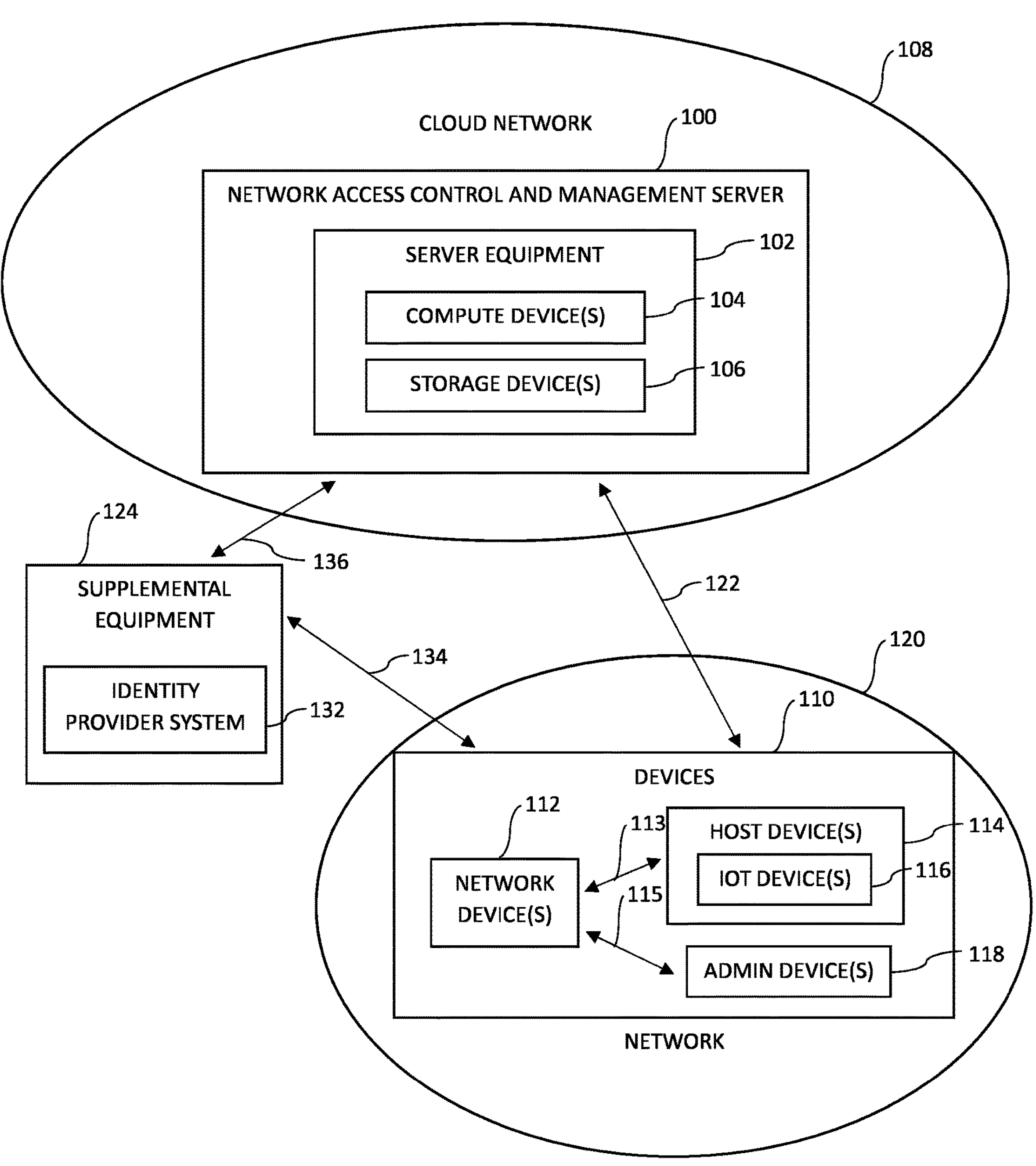
FIG. 1 is a diagram of an illustrative system for facilitating secure remote device access in accordance with some embodiments.

A network can convey network traffic, e.g., in the form of frames, packets, etc., between hosts. The hosts may be coupled to intervening network devices of the network that forward the network traffic. Such a networking system can include a mechanism by which at least some of the devices of the network (e.g., network devices, certain types of host devices, etc.) are remotely accessible by network administrators or other authorized users for performing device administration functions (e.g., device management, device configuration, receiving device operational information, etc.). However, the manner in which administrator computing devices gain remote access to these devices can be complex and/or non-intuitive, e.g., to administrators without certain knowledge. In other instances, simplistic schemes to remotely access devices may compromise network security. Accordingly, it may be desirable to provide an intuitive yet secure mechanism by which administrator devices can gain remote access to the devices of a network.

In some illustrative configurations described herein as illustrative examples, a networking system may include a device access management server (sometimes referred to as an authentication server) that facilitates remote access of a target device by an accessing device. The accessing device such as a computing device operable by a network administrator may implement a user interface (e.g., for a web browser application) and receive user input and present user output. A device administration portal on the web browser application running on the computing device may communicate with the device access management server. The device access management server may use the device administration portal to facilitate access to the target device.

In particular, the device access management server may issue a session token after receiving an indication of successful user identity authentication of the accessing device (e.g., of the user of the accessing device). The device access management server may provide the accessing device with a target device access application (e.g., with an installation file to install the target device access application) and the session token. Processing circuitry of the accessing device may run the target device access application to use the issued session token to request secure (administrator) access to the target device (e.g., based on user input as received by the device administration portal and/or the device access management server). The target device may grant the access request of the accessing device after exchanging messages with the device access management server to authenticate the session token. The device access management server may authenticate (e.g., verify, validate, etc.) the session token and generally assist in establishing and maintaining the secure session between the accessing device and the target device through the device management portal executing on the access device. By using a session-token-based approach to establish the target device access session, the networking system may provide a secure mechanism (e.g., a password-less mechanism) for target device access. Additionally, the use of the device access management server to provide a web-based (e.g., based on a web browser application) mechanism to obtain remote device access may help simplify the target access operation by abstracting away from the numerous steps that otherwise would have been performed manually by the network administrator at the accessing device.

The contexts and/or advantages described above are merely illustrative. If desired, any suitable system may employ the mechanism(s) described above and/or further detailed herein to improve the mechanism(s) by which target devices are accessed by accessing devices (e.g., impart the above-mentioned advantages and/or other advantages). An illustrative networking system in which the above-mentioned mechanism for facilitating remote access of a target device by an accessing device may be implemented is shown in FIG. 1.

FIG. 1 is a diagram of an illustrative networking system that includes a server such as server 100. Server 100 may be formed from server equipment 102 containing any suitable number of compute devices 104 and any suitable number of storage devices 106.

As an example, server equipment 102 may include server hardware such as blade servers, rack servers, and/or tower servers. Configurations in which server equipment 102 includes rack servers mounted to racks of a server chassis or enclosure are sometimes described herein as an illustrative example. Each of compute devices 104 and/or storage devices 106 may be provided as part of the server hardware (e.g., as part of the rack servers).

Compute devices 104 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures. Storage devices 106 may include non-volatile memory (e.g., flash memory or other electrically-programmable read-only memory configured to form a solid-state drive), volatile memory (e.g., static or dynamic random-access memory), hard disk drive storage, solid-state storage, and/or other storage circuitry.

More specifically, storage devices 106 may include one or more non-transitory (tangible) computer readable storage media that store the operating system software and/or any other software code, sometimes referred to as program instructions, software, data, instructions, or code. Compute devices 104 may run (e.g., execute) an operating system and/or other software/firmware that is stored on storage devices 106 to perform the desired operations of server 100. In such a manner, server equipment 102 may implement one or more services, one or more applications (e.g., each containing one or more services), one or more software servers, and/or other software features to collectively perform the functions of network access control and/or network management for server 100. As described herein, server 100 refers to the underlying server (hardware) equipment and/or the server software (e.g., services and/or applications) executed thereon to perform the operations of server 100.

As just a few illustrative examples, server 100 may be configured to provide network policy reception, definition, and enforcement (e.g., reception, definition, and enforcement of segmentation policy and/or security policy via virtual local area networks (VLANs), access control lists (ACLs), vendor-specific attributes (VSAs), and/or other policy-defining features), natural language query, processing, and response (e.g., a chat interface for outputting network information and network configuration assistance and recommendation based on user natural language input), network-connected device profiling (e.g., the gathering, storage, and analysis of network-connected device information to facilitate network policy recommendations and/or other network configuration recommendations), predictive failure event handling (e.g., prediction and handling of future expected (yet-to-occur) failure events associated with server infrastructure and/or network configuration), network authentication (e.g., authentication for user and/or user device(s) connected to the network), public key infrastructure (PKI) (e.g., includes a certificate authority, a certificate issuance service, a certification validation and/or status lookup service, a certificate database, etc.), interfacing and integration services with external applications and/or servers (e.g., to obtain network and/or user information from external equipment and distribute network and/or user information to external equipment), and device and/or user onboarding (e.g., registration and storage of user and/or user device information).

In general, server 100 may perform any suitable functions for network access control and network management. Configurations in which server 100 facilitates secure remote access of a target device such as a network device by an accessing device (e.g., by implementing the functions described herein in connection with server 400 in FIG. 4) are sometimes described herein as an illustrative example. In other words, server 400 as described herein may be formed from at least part of server 100. Server equipment 102 implementing server 100 may perform the operations described in connection with server 400 instead of or in addition to any of the other illustrative functions as described in the examples above.

In the example of FIG. 1, server 100 may be implemented as a part of a network such as cloud network 108. Cloud network 108 may include one or more network devices such as switches (e.g., multi-layer switches), routers, gateways, bridges, hubs, repeaters, firewalls, wireless access points, devices serving other networking functions, devices that include a combination of these functions, or other types of network devices. Multiple such network devices (e.g., of different types or having different functions) may be present in cloud network 108 and interconnected therebetween and with other network devices to form a cloud network that forwards traffic to and from different portions of server 100 (e.g., different compute and/or storage devices of server equipment 102) serving as end hosts of cloud network 108.

Configurations in which server 100 is implemented on public cloud infrastructure (e.g., cloud network 108 is a public cloud network) are sometimes described herein as an illustrative example. If desired, server 100 may be implemented on a private cloud network or an on-premise network.

Server 100 may communicate with (client) devices 110 of network 120 such as network devices 112, host devices 114 (e.g., Internet-of-Things (IoT) devices 116 such as network-connected appliances or devices such as cameras, thermostats, wireless sensors, medical or health sensors which are sometimes referred to as Internet-of-Medical-Things (IOMT) devices, or other sensors, lighting fixtures, speakers, printers, or other output devices, controllers or other input devices, and other network-connected equipment that serve as input-output devices and/or computing devices in a distributed networking system). Devices 110 of network 120 may also include one or more network administrator devices 118 (e.g., a computing device operated by a network administrator or a user with network administrator privileges to perform configuration and administration of network devices 112). If desired, a device 118 may serve as an end host of network 120 or may simply connect to network device(s) 112 for device administration without necessarily being an end host of network 120.

In some arrangements described herein as an illustrative example, communication between server 100 and at least some (end) host devices 114 may occur via network devices 112 and links 113 (e.g., network devices 112 may forward network traffic between server 100 and host devices 114 to facilitate communication therebetween). Devices 110 may form part of network 120 for which server 100 provides the above-mentioned functions (e.g., facilitation of secure remote access of a target device such as a network device by an accessing device, network access control and management functions containing any combination of network policy handling, natural language query handling, network-connected device profiling, predictive failure event handling, network authentication, public key infrastructure (PKI) services, interfacing and integration services with external applications and/or servers, device and/or user onboarding, etc.).

Host devices 114 may serve as end hosts of network 120 connected to each other and/or connected to other end hosts of other networks (e.g., server 100 of cloud network 108) via network devices 112 using communication paths 113. Administrator devices 118 may perform network administration for network devices 112. Other types of user devices may serve as end host devices 114. Network devices 112 may include switches (e.g., multi-layer switches), routers, gateways, bridges, hubs, repeaters, firewalls, wireless access points, devices serving other networking functions, devices that include a combination of these functions, or other types of network devices.

Server 100 may provide network access control and network management services for network 120 by communicating with devices 110 via communication paths 122. To facilitate network access control and network management, server 100 may communicate with other supplemental equipment 124 (e.g., other servers implemented on server equipment similarly containing compute(s) and/or storage device(s)). Supplemental equipment 124 may sometimes be referred to as external equipment 124 when implemented on equipment external to server equipment 102 on which server 100 is implemented. Configurations in which server 100 communicates with one or more systems or platforms that provide additional contextual information for network 120, the users of network 120, and/or devices 110 on network 120 such as an identity provider system or platform 132 are sometimes described herein as an illustrative example. System 132 may be implemented using one or more servers to execute one or more services that provide user identity authentication, supply user contextual information such as user role or identity information, and/or supply other types of user and user device information (e.g., services provided as part of a single sign-on (SSO) provider platform).

If desired, supplemental equipment 124 may include network management and network device management system(s) such as a wireless access point provisioning and management system (e.g., a wireless access point management server), a network switch provisioning and management system (e.g., a network switch management server), and/or other network device management equipment that communicate with network devices 112 (e.g., to supply provisioning and/or configuration data, to receive network performance metrics data, and/or to exchange other suitable information), may include network analysis system(s) such as servers and/or services that provide analysis of network performance by way of providing endpoint visibility and security analysis (e.g., based on network traffic to and/or from host devices 114), and/or may include other systems or platforms that interact with server 100 and/or devices 110.

Supplemental equipment 124 may communicate with components of network 120 (e.g., network devices 112 and host devices 114) to supply provisioning, configuration, and/or control data, to receive network, device, and/or user information, and/or to otherwise exchange information therebetween via communications paths 134. Supplemental equipment 124 may communicate with server 100 (e.g., different portions of server equipment 102) to transmit the received network, device, and/or user information, to receive network access control and/or management information, and/or to otherwise exchange information therebetween via communications paths 136.

Configurations in which identify provider system 132 provides a cloud-based platform (e.g., includes services and/or applications executing on server equipment of the same type(s) as described in connection with server equipment 102) are sometimes described herein as illustrative examples. In these examples, equipment 124 (e.g., system 132) may be implemented within the same cloud network as or different cloud networks than server 100. If desired, one or more systems of supplemental equipment 124 may be implemented locally (e.g., local to network 120) instead of as a cloud application (e.g., implemented on cloud-based server equipment) or may be implemented in other desired manners.

The networking system in FIG. 1 (e.g., the combination of cloud network 108, network 120, and equipment 124) may span any suitable scope (e.g., may span an overall network of any suitable scope) depending on the implementations of server 100, devices 110, and/or supplemental equipment 124. Communication paths 122, 134, and 136 may be implemented according to the scope of the networking system. Configurations in which one or more (e.g., all) of communication paths 122, 134, and 136 include the Internet are sometimes described herein as an illustrative example. In particular, any of communications paths 122, 134, and 136 may implement communication (e.g., exchanges messages in the form of frames, packets, etc.) based on a secure Hypertext Transfer Protocol (e.g., Hypertext Transfer Protocol Secure (HTTPS)), a Remote Authentication Dial-In User Service (RADIUS) protocol (e.g., a RADIUS protocol with Transport Layer Security (TLS) encryption sometimes referred to as a RadSec protocol or another type of secure RADIUS protocol), and/or other secure protocols for establishing and communicating using the corresponding communications paths, as just a few examples.

Figure 2:
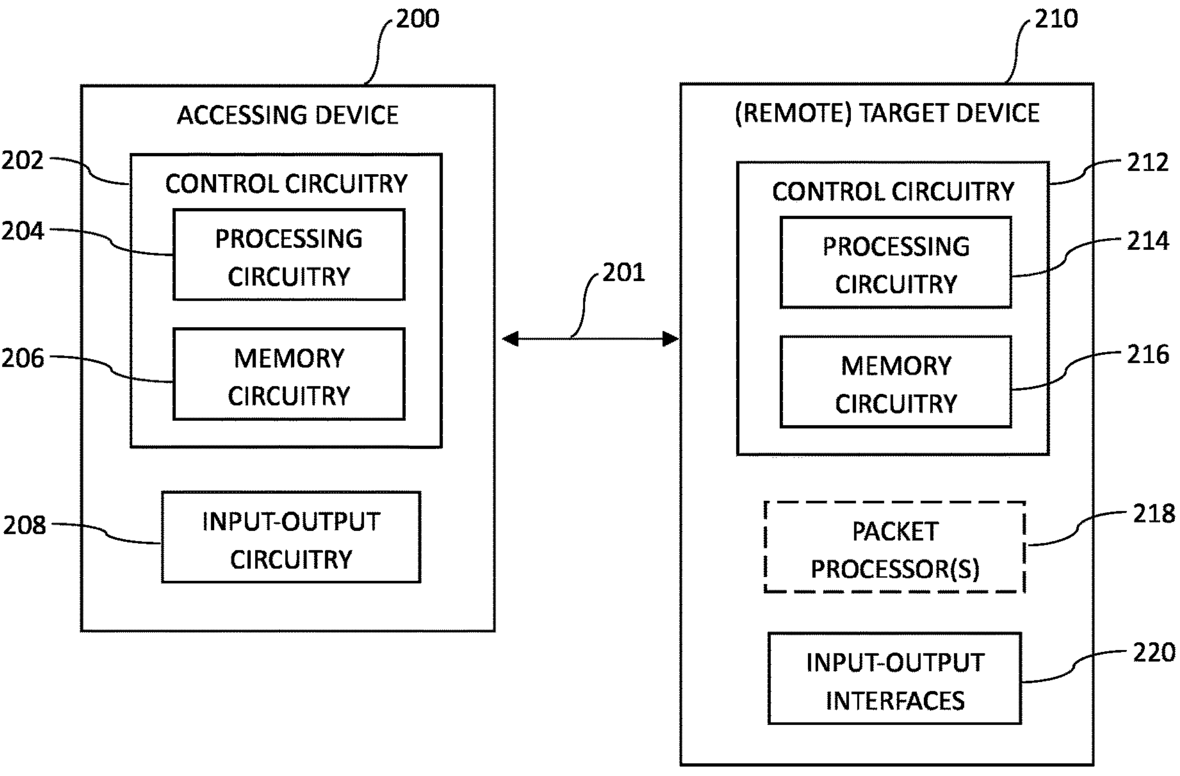
FIG. 2 is a diagram of an illustrative accessing device communicatively coupled to an illustrative target device in accordance with some embodiments.

In order to administer and/or manage devices within a networking system, these devices may be configured to support remote access. In particular, a first device (sometimes referred to herein as an accessing device) may gain access to a second device (sometimes referred to herein as a target device). This may allow a user (e.g., a network administrator) operating the first device to remotely provide input to and/or remotely receive output from the second device. FIG. 2 is a diagram of an illustrative accessing device communicatively coupled to a target device.

As shown in FIG. 2, an accessing device such as device 200 may access a target device such as device 210 by establishing a secure communication session (e.g., over communication link 201). In some illustrative arrangements sometimes described herein as an example, accessing device 200 may use the secure communication session to perform device administration of target device 210. As examples, device 200 may use the secure communication session to supply device 210 with configuration data, control signals, and/or other networking information, to receive output such as performance metrics, log information, and/or other operational data from device 210, and/or to otherwise communicate with device 210 in order to perform other networking functions. Configurations in which the secure communication session is established based on Secure Shell (SSH) protocol are sometimes described herein as an illustrative example. If desired, other remote access protocols (e.g., remote login protocols, remote file transfer protocols, etc.) may be used to establish a communication session between accessing device 200 and target device 210.

In the example of FIG. 2, accessing device 200 may be a computing device that includes control circuitry 202 with processing circuitry 204 and memory circuitry 206 and that includes input-output circuitry 208, among other components. Processing circuitry 204 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 204 may run (e.g., execute) a computing device operating system and/or other software/firmware that is stored on memory circuitry 206. Memory circuitry 206 may include one or more non-transitory (tangible) computer-readable storage media that stores the operating system software and/or any other software code, sometimes referred to as program instructions, software instructions, software, data, instructions, or code. As examples, the operations performed by device 200 to access target device 210 as described herein may be stored as (software) instructions on the one or more non-transitory computer-readable storage media (e.g., in portion(s) of memory circuitry 206 in device 200). The corresponding processing circuitry (e.g., one or more processors of processing circuitry 204 in device 200) may process or execute the respective instructions to perform the operations for accessing target device 210.

Memory circuitry 206 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 200), and/or other storage circuitry. Processing circuitry 204 and memory circuitry 206 as described above may sometimes be referred to collectively as control circuitry 202 for device 200. Control circuitry 202 of device 200 may control the operation of other components such as components of input-output circuitry 208 (e.g., by outputting signals, commands, data, etc., to these components based on processing received signals, commands, data, etc.).

Input-output circuitry 208 may include one or more input-output devices configured to implement one or more user interfaces with which a user (e.g., a network administrator) can interact with device 200, e.g., by receiving user input and/or supplying the user with output (user output). As examples, these one or more input-output devices may include one or more displays (e.g., an integrated display or an external monitor, a touchscreen display, a touch-insensitive display, etc.), other types of light-emitting devices, an integrated or external keyboard, an integrated or external touchpad or trackpad, a mouse, other types of keys, buttons, or wheels, and/or any other devices configured to receive user input and/or supply user output.

Input-output circuitry 208 may include interface circuitry through which internal components (e.g., processing circuitry 204, memory circuitry 206, etc.) may interface and communicate with external equipment such as one or more servers, one or more target devices, and/or one or more external input-output devices. As examples, the interface circuitry may include physical ports (e.g., in which external connectors coupled to external equipment are received to facilitate communication therebetween), may include wireless communication circuitry (e.g., antennas, transceivers, radios, etc.) to facilitate communicative coupling to external equipment, may include encoders and/or decoders (e.g., circuits that encode/decode data for conveyance across wired and/or wireless mediums), and/or may include other types of interface circuitry. While the interface circuitry is described as part of input-output circuitry 208, which is shown as being separate from processing circuitry 204, this is merely illustrative. If desired, some portions of the interface circuitry (e.g., at least circuitry that perform higher-level functions such as implementing a graphical user interface for display) may be implemented by (portions of) processing circuitry 204.

Device 200 may be implemented as any suitable type of computing device or equipment. As examples, device 200 may be a desktop computer, a laptop computer, a tablet computer, a smartphone, server-based (computing) equipment, a network controller or other type of network management device, or other types of computing devices. Configurations in which device 200 is a computing device operable by a network administrator such as an administrator device 118 in FIG. 1 are sometimes described herein as an illustrative example. Device 200 may sometimes be referred to herein as a user device (with the network administrator as the user).

In the example of FIG. 2, target device 210 may include control circuitry 212 having processing circuitry 214 and memory circuitry 216, one or more packet processors 218, and input-output interfaces 220 (e.g., network interfaces). Processing circuitry 212 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 214 may run (e.g., execute) an operating system and/or other software/firmware that is stored on memory circuitry 216. Memory circuitry 216 may include one or more non-transitory (tangible) computer-readable storage media that stores the operating system software and/or any other software code, sometimes referred to as program instructions, software instructions, software, data, instructions, or code. As examples, the operations for supporting remote access of target device 210 as described herein may be stored as (software) instructions on the one or more non-transitory computer-readable storage media (e.g., in portion(s) of memory circuitry 216 in device 210). The corresponding processing circuitry (e.g., one or more processors of processing circuitry 214) may process or execute the respective instructions to perform the operations for supporting remote access of target device 210.

Memory circuitry 216 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 210), and/or other storage circuitry. Processing circuitry 214 and memory circuitry 216 as described above may sometimes be referred to collectively as control circuitry 212 (e.g., implementing a control plane of target device 210 when implemented as a network device). Control circuitry 212 of device 210 may control the operation of other components such as one or more packet processors 218 and/or input-output interfaces 220 (e.g., by outputting signals, commands, data, etc., to these components based on processing received signals, commands, data, etc.).

In some illustrative configurations described herein as an example, target device 210 may be a network device. In these configurations, target device 210 may include one or more packet processors 218. Packet processor(s) 218 may be used to implement a data plane or forwarding plane of device 210. Packet processor(s) 218 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 218 may receive incoming network traffic via input-output interfaces 220, parse and analyze the network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 216 and/or other memory circuitry integrated as part of or separate from packet processor 218.

Input-output interfaces 220 may include different types of communication interfaces such as Ethernet interfaces (e.g., formed from one or more Ethernet ports), optical interfaces, Bluetooth interfaces, Wi-Fi interfaces, and/or other network interfaces for connecting device 210 to the Internet, a local area network, a wide area network, a mobile network, generally other network device(s) in these networks, and/or other computing equipment (e.g., host equipment such as server equipment, user devices, etc.). As an example, some input-output interfaces 220 (e.g., those based on wired communication) may be implemented on physical ports (sometimes referred to as sockets). These physical ports may be configured to physically couple to and/or electrically connect to corresponding mating connectors of external components or equipment. Different ports may have different form-factors to accommodate different cables, different modules, different devices, or generally different external equipment. As another example, some input-output interfaces 220 (e.g., those based on wireless communication) may be implemented using wireless communication circuitry (e.g., antennas, transceivers, radios, etc.).

In configurations in which target device 210 is a network device, processing circuitry 214 may execute network device control plane software such as operating system software, routing policy management software, routing protocol agents or processes, routing and/or forwarding information base agents, and other control software, may be used to support the operation of protocol clients and/or servers (e.g., to form some or all of a communications protocol stack such as the TCP/IP stack), may be used to support the operation of packet processor(s) 218, may store packet forwarding information, may execute packet processing software, and/or may execute other software instructions that control the functions of device 210 and the other components therein.

As examples, when target device 210 is a network device, device 210 may be or include a switch (e.g., single-layer (L2) switches and/or multi-layer (L2 and L3) switches), a bridge, a router, a gateway, a hub, a repeater, a firewall, a wireless access point, another type of network device serving other networking functions, a network device that includes the functionality of two or more of these devices, a management (controller) device that control the operation of one or more other network devices, and/or other types of network devices. Configurations in which device 210 is a network device such as a network device 112 in FIG. 1 are sometimes described herein as an illustrative example.

In some instances, accessing device 200 may be on a local network (portion) while target device 210 may be on a remote network (portion) relative to the local network (portion) of accessing device 200. Accordingly, target device 210 may sometimes be referred to as remote target device 210 and accessing device 200 may remotely access target device 210.

An SSH protocol or other types of remote access protocols may be used to establish a corresponding (SSH) session over communication link 201 between accessing device 200 and target device 210. Such a communication session over link 201 may provide secure remote access to target device 210 over an unsecure network (e.g., a public network such as the Internet).

To establish the SSH communication session, a user operating the accessing device may control the accessing device to execute a local SSH client application that connects to a SSH server (application) executing on the target device to be accessed. The SSH client application may prompt the user to manually enter login credentials and/or other information at the accessing device to authenticate the session. The manual entry of login credentials by the user and other password-based approaches to authenticate the session may be inherently less secure than other passwordless approaches. While in some instances host key(s) and other certificate(s) may be stored on accessing device 200 and accessed to authenticate the session, this may not be possible with certain types of target devices (e.g., at least some network devices, devices without public key infrastructure, etc.).

Figure 3:
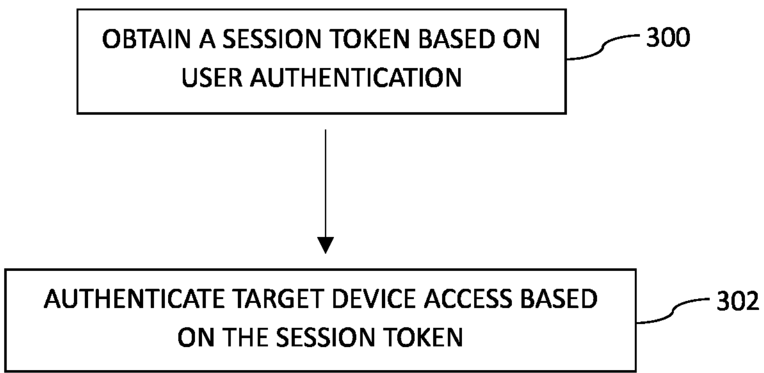
FIG. 3 is a flowchart of illustrative operations for accessing a target device using a session-specific token in accordance with some embodiments.

To improve the mechanism(s) by which a target device performs the secure access of a target device, a networking system may employ a session-specific token, among other features, to facilitate secure access of the target device. FIG. 3 is a diagram of illustrative operations for obtaining access to a target device based on the use of a session-specific token.

These operations may be performed by one or more processors of different devices, equipment, and/or systems of a networking system. As one illustrative example, these operations may be performed with processing circuitry of server 100 in FIG. 1 (e.g., compute devices 104), processing circuitry 204 of accessing device 200 in FIG. 2, and/or processing circuitry 214 in network device 210. The illustrative operations described in connection with FIG. 3 may generally be performed by the corresponding processing circuitry of the device or system (e.g., compute devices 104, processing circuitry 204, and processing circuitry 214) by executing software instructions stored on the corresponding memory circuitry of the device or system (e.g., storage devices 106, memory circuitry 206, and memory circuitry 216). If desired, one or more operations described in connection with FIG. 3 may be performed by other dedicated hardware components in server 100, device 200, and/or device 210. As another illustrative example, the operations described in connection with FIG. 5 may be performed by devices, equipment, and/or systems of the networking system in FIG. 5. If desired, these operations may be performed by devices, equipment, and/or systems in networking systems configured in other manners.

As shown in FIG. 3, at block 300, the networking system may obtain a session-specific token based on user authentication. In particular, different elements of the networking system may generate, distribute, maintain, or otherwise use the session-specific token for the authentication of the secure access of a target device by an accessing device which results in the establishment of a secure communication session therebetween. The session-specific token (sometimes referred to as a session token or session key) may be specific or unique to a particular communication session between an accessing device and a target device. In other words, different communication sessions (e.g., between different pairs of accessing and target devices or even between the same pair of accessing and target devices at different times) may be associated with different session-specific tokens. If desired, the same session token (e.g., from a fixed finite pool of session tokens) may be reused at different times.

Because the session token uniquely identifies or otherwise is uniquely associated with a single communication session, the session token may sometimes be referred to as a session identifier or may be an example of session-identifying information. Because the session token is generated based on the specific session for which the token authenticates, the session token may also be used as a key in looking up (or generally identifying) the information of the specific session. To use the session-specific token in a secure manner, the identity of the user of the accessing device should be (successfully) authenticated prior to the session-specific token being generated and/or otherwise used to authenticate the access to the target device.

In one illustrative arrangement, a server (e.g., server 100 in FIG. 1 or more specifically server 400 in FIGS. 4-9) may generate the session token, store the generated session token, and generally maintain the session token (along with other information for the session) during the lifecycle of the session (e.g., while the session token remains valid, while user authentication has not expired, and/or while the session remains active). The server may distribute the session token to an accessing device (e.g., device 200 in FIG. 2, device 118 in FIG. 1, etc.) for which user authentication has been performed. In particular, the server may generate the session token and/or distribute the session token to the accessing device in response to an indication of successful authentication of the identity of the user of the accessing device (e.g., as a network administrator authorized to perform device administration for the target device). As part of a request (message) to establish a secure communication session, the session token may be received by a target device (e.g., device 210 in FIG. 2, device 112 in FIG. 1, etc.) from the accessing device.

At block 302, the networking system may authenticate (e.g., verify, validate, etc.) target device access (by the accessing device) based on the session token, thereby facilitating the establishment of a secure communication session between the accessing device and the target device. In one illustrative arrangement, the server (e.g., server 100 in FIG. 1 or more specifically server 400 in FIGS. 4-9) may maintain a session record for the session that contains information for authenticating target device access (e.g., a user access profile indicative of user network privileges and/or other session or user contextual information). The target device (e.g., device 210 in FIG. 2, device 112 in FIG. 1, etc.) seeking to authenticate the request for access received from the accessing device (e.g., device 200 in FIG. 2, device 118 in FIG. 1, etc.) may forward the session token as received from the accessing device to the server for authentication. After successful token authentication (e.g., after the target device receives an indication of successful token authentication and/or receives an access profile or other contextual information indicative of successful token authentication from the server), the target device may grant access to the accessing device and establish the communication session (e.g., over link 201).

Figure 4:
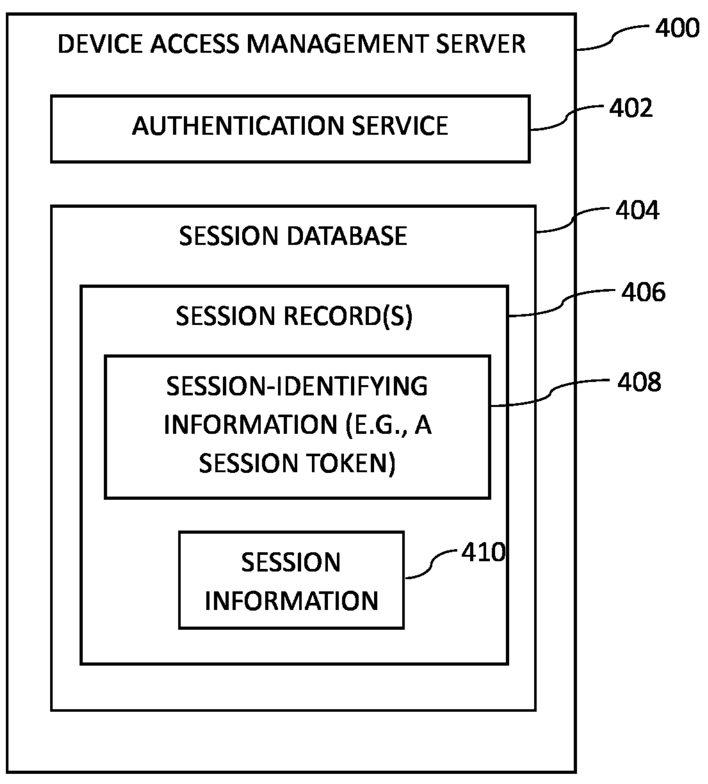
FIG. 4 is a diagram of an illustrative server for managing access sessions between accessing devices and target devices in accordance with some embodiments.

An illustrative server for performing the operations for facilitating target device access by an accessing device via a secure communication session (e.g., as described in connection with FIG. 3 and generally herein) is shown in FIG. 4. In the example of FIG. 4, a device access management server 400 (sometimes referred to as a session token authentication server or an authentication server) may include (e.g., implement) an authentication service 402 and session database 404. Authentication service 402 may receive authentication requests (e.g., from the target device) containing session tokens, process the session tokens to authenticate the session tokens, and send authentication responses (e.g., to the target device) indicative of whether or not authentication was successful and/or user access profile information or other user and/or session contextual information. Session database 404 may maintain session tokens and/or other session information during the life cycles of the session tokens and/or the sessions.

Server 400 may generally be implemented as part of a networking system such as part of the networking system of FIG. 1. In some illustrative arrangements sometimes described herein as an example, device access management server 400 may be implemented as part of server 100 (FIG. 1). In particular, authentication service 402 and/or session database 404, and/or other (software) components of server 400 may be implemented using server equipment 102 or more specifically compute devices 104 and storage devices 106 of FIG. 1. In other illustrative arrangements, device access management server 400 may be implemented separately from server 100 (e.g., implemented on server equipment such as compute devices and/or storage devices separate and distinct from those implementing server 100). If desired, at least some (e.g., all) of the operations described in connection with server 400 may be implemented in any other suitable manner (e.g., using non-server-based or non-cloud-based implementations).

Processing circuitry (e.g., compute device(s) 104) of server 400 may execute software instructions stored on memory circuitry (e.g., storage device(s) 106) of server 400 to perform the operations of authentication service 402 (e.g., to handle requests to authenticate session tokens as described in connection with FIG. 3). To assist in the authentication of session tokens and generally maintain session information, the processing circuitry of server 400 may maintain (e.g., generate, delete, and/or otherwise update) session database 404 stored at the memory circuitry of server 400. In particular, session database 404 may include one or more session records 406 each indicative of a corresponding active (e.g., currently active or authorized (user-identity-authenticated) but not yet established) remote target device access communication session between a different pair of accessing and target devices.

Each session record 406 may be associated with a communication session for remote target device access and may include session-identifying information 408 such as a session token and session information 410 for the communication session. Session-identifying information 408 such as a session token may serve as a key to look up a corresponding session record 406. As an illustrative example, authentication service 402 may receive, from the target device, session-identifying information 408 (e.g., a session token) to authenticate a request for remote target device access (e.g., to establish the corresponding communication session). As part of the authentication process, authentication service 402 may perform a lookup operation (e.g., compare and match the received session token to the session token stored as information 408) to identify the specific record 406 for the corresponding (authorized but yet to be established) session. Authentication service 402 may send an indication of successful authentication to the target device based on the lookup operation and the identified session record 406. The indication of successful token authentication may include information about the accessing device (e.g., the user identity of the accessing device, a user access profile indicative of user privileges for device access, specific information about whether or not the user is authorized to access the specific target device, and/or other contextual information about the session being established, about the accessing device, or about the user of the accessing device).

In some illustrative configurations described herein as an illustrative example, the processing circuitry of server 400 may maintain session record(s) 406 for only active (e.g., currently active or authorized but yet to be established) sessions within database 404. In other words, when an accessing device terminates its communication session with a target device, the session record 406 corresponding to this communication session may be removed from database 404. If desired, the processing circuitry of server 400 may separately maintain logs of previous (now inactive) sessions and/or other session information (without session tokens). In other words, session tokens may be assigned only to active sessions in active session records 406 of database 404.

Figure 5:
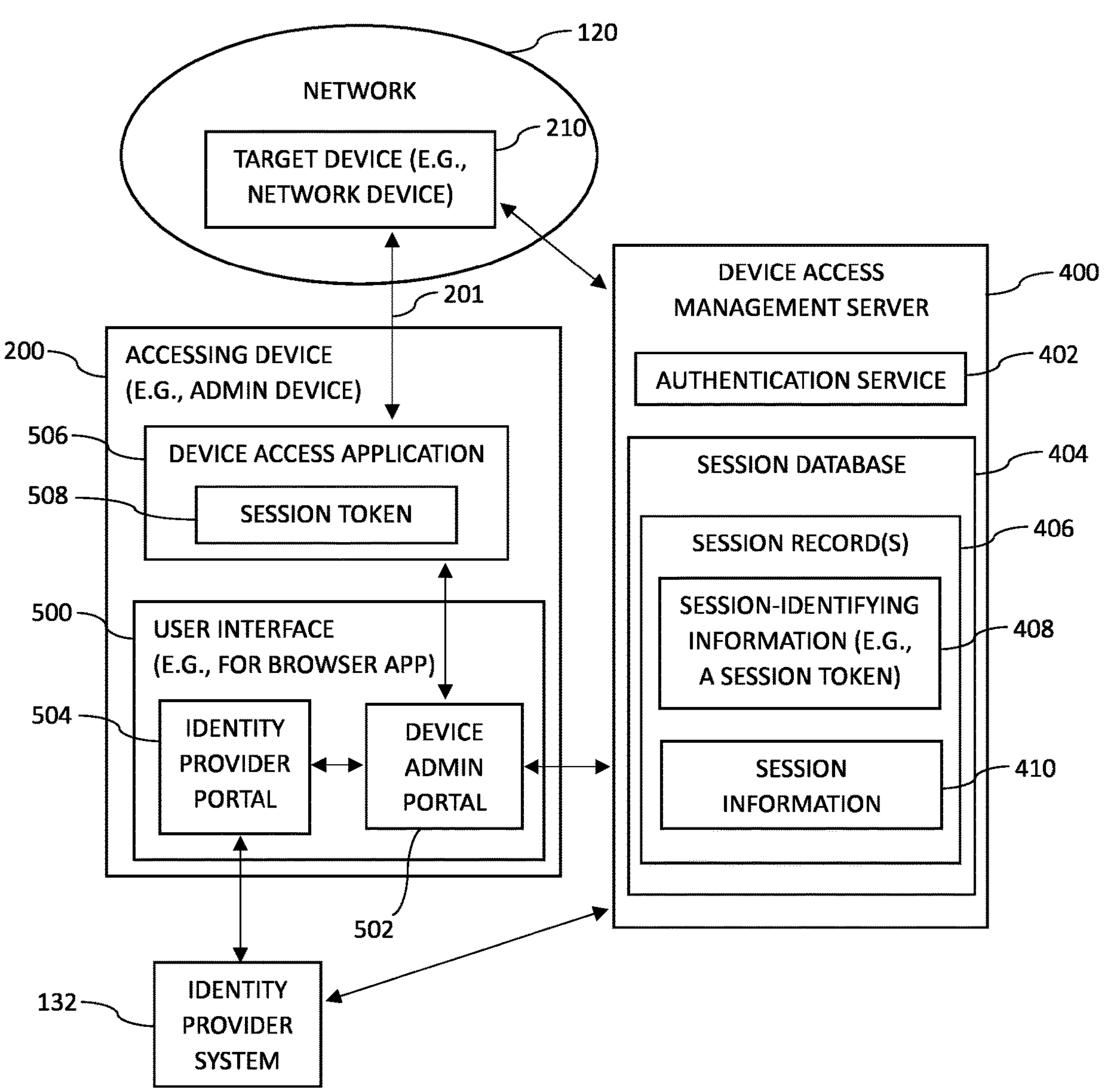
FIG. 5 is a diagram of an illustrative target device access system that includes a target device, an accessing device, a user authentication system, and a device access management server in accordance with some embodiments.

FIG. 5 is a diagram of an illustrative implementation of a networking system that contains server 400 that facilitates (e.g., authenticates) device access of target device 210 by accessing device 200. In the example of FIG. 5, accessing device 200 may be a user or administrator device (e.g., administrator device 118 in FIG. 1) and target device 210 may be a network device in a network configured to forward network traffic between host devices (e.g., network device 112 in FIG. 1). However, this example is merely illustrative. The mechanism(s) described herein for facilitating device access via a secure communication session may similarly be applied to other types of accessing and/or target devices.

As shown in FIG. 5, device 200 may provide a user interface such as user interface 500 usable to facilitate user interactions with device 200 and more specifically with the target device access operations described herein. In some illustrative configurations described herein as an example, processing circuitry of device 200 (e.g., processing circuitry 204) may execute a web browser application and provide a graphical user interface for the web browser application based on which user interface 500 is implemented. In particular, the user may supply input via input-output devices of input-output circuitry 208 in FIG. 2 (e.g., via a touchscreen display, a keyboard, a mouse, a touchpad or trackpad, etc.) as user commands to the graphical user interface, and thereby the web browser application. Analogously, the graphical user interface may supply output (e.g., from the web browser application) that is presented to the user via input-output devices of input-output circuitry 208 in FIG. 2. As an example, output from the graphical user interface may be presented on a display for viewing by the user.

The use of a graphical user interface to facilitate user interactions with the web browser application is merely illustrative. If desired, other types of interfaces such as an application programming interface, a command line interface, etc., may be used to facilitate user interactions with the web browser application and/or other applications executing on processing circuitry 204 of device 200 such as a target device access application. As described herein, user interface 500 may include the software interfaces implemented by processing circuitry 204 (e.g., a graphical user interface, an application programming interface, a command line interface, etc.) and the input-output devices (e.g., input-output circuitry 208) by which the user physically interacts to supply input and receive output.

In configurations in which a device access management function is implemented using a server (e.g., server 400) or as a cloud-based system, device 200 may execute the web browser application to communicate with the device access management server via a web-based portal (application) such as device administration portal 502 (e.g., a web page or website associated with device administration portal 502 accessible over the Internet). The server may supply content to provide device administration portal 502 for display at device 200 and may receive (user or application) input via device administration portal 502. The user may interact with device administration portal 502 on the web browser application via user interface 500. In other arrangements (e.g., where a device access management function is provided on an on-premise system or other dedicated hardware such as a controller or management device), device administration portal 502 may be implemented on a non-web-based platform (e.g., as a local application) to communicate with the device access management system.

While in some illustrative arrangements server 400 may perform user onboarding and user authentication services, in other illustrative arrangements described herein as illustrative examples, user onboarding and/or user authentication may be performed via an external user identity authentication system such as identity provider system 132 (sometimes referred to as an identity provider platform or a single sign-on platform).

To facilitate user identity authentication of the user of accessing device 200, device 200 may execute a user authentication portal such as identity provider portal 504 through which a user identity system such as identity provider system 132 may be accessed. In some illustrative arrangements described herein, identity provider portal 504 may be provided on the web browser application (e.g., as a web-based portal application). In other words, device 200 may communicate with identity provider system 132 (e.g., an identity provider server) via a web page or website associated with identity provider portal 504 accessible over the Internet. The identity provider server may supply content to provide identity provider portal 504 for display at device 200 and may receive (user or application) input via identity provider portal 504. The user may interact with identity provider portal 504 on the web browser application via user interface 500. If desired, an identity provider system or other types of user identity authentication servers may be provided on an on-premise system or other dedicated hardware such as a controller or management device, and identity provider portal 504 may be implemented on a non-web-based platform to communicate with the user identity provider system. If desired, server 400 may implement identity provider system 132 (e.g., by providing user identity authentication functionalities such as those described herein in connection with identity provider system 132).

Identity provider system 132 may authenticate the identity of the user of device 200 and communicate any appropriate user information to server 400 (e.g., via application programming interface(s) (APIs) at system 132 and/or server 400 that facilitate communication therebetween). In particular, identity provider system 132 may perform user onboarding and store a database of user information. The database of user information (e.g., stored on storage devices of server equipment implementing the identity provider server) may include user records containing user (login) credentials such as a username and a password, containing role information of the user (e.g., a network administrator, a non-administrator employee, a user department within an organization, etc.), containing user access profile information indicative of network privileges on the network (e.g., types of devices accessible to the user for device administration, network portions accessible to the user for device administration, etc.), and/or containing other types of user information.

Using user interface 500, identity provider portal executing on processing circuitry 204 of device 200 may receive user login credentials as user input and may forward the received user login credentials to identity provider system 132. System 132 may authenticate the received login credentials and provide a result of user identity authentication based on the forwarded user login credentials to server 400 via an interface such as an application programming interface, a web-based interface, etc. Server 400 may receive the result of user identity authentication (e.g., an indication of successful user identity authentication). Based on the received indication of successful user identity authentication, server 400 may generate a corresponding record 406 with an accompanying session token (e.g., as information 408) to authorize a communication session for remote access to be established between accessing device 200 and target device 210. Server 400 may also receive any suitable user information from system 132 or from other sources and use the received user information to populate session information 410.

In addition to supplying content to device 200 to construct device administration portal 502 on the web browser application, server 400 may also provide an installation file for a target device access application (e.g., application 506) to be locally installed on device 200. After installation, processing circuitry 204 on device 200 may execute a target device access application 506. Target device access application 506 may send a request (message) to target device 210 that includes session token 508 received from server 400 responsive to a successful user identity authentication of the user of device 200.

Target device 210 may receive the request and process the request by authenticating session token 508, among other information, contained within the request. In configurations described herein as an illustrative example, target device 210 may communicate with server 400 to authenticate session token 508 (e.g., by exchanging at least an authentication request message from device 210 to server 400 and an authentication response message from server 400 to device 210) and grant administrator access for device administration to device 200 (e.g., causing a secure communication session for remote target device access to be established). In particular, authentication service 402 (e.g., application software stored on storage devices 106 such as one or more non-transitory computer-readable storage media and executed on processing circuitry such as compute devices 104) on server 400 may perform the authentication of session token 508 for target device 210 based on using records 406 stored in database 404.

FIGS. 6-9 further detail illustrative operations performed by different devices, server(s), and/or system(s) of the networking system in FIG. 5 to facilitate the establishment of a secure communications session for target device access.

Figure 6:
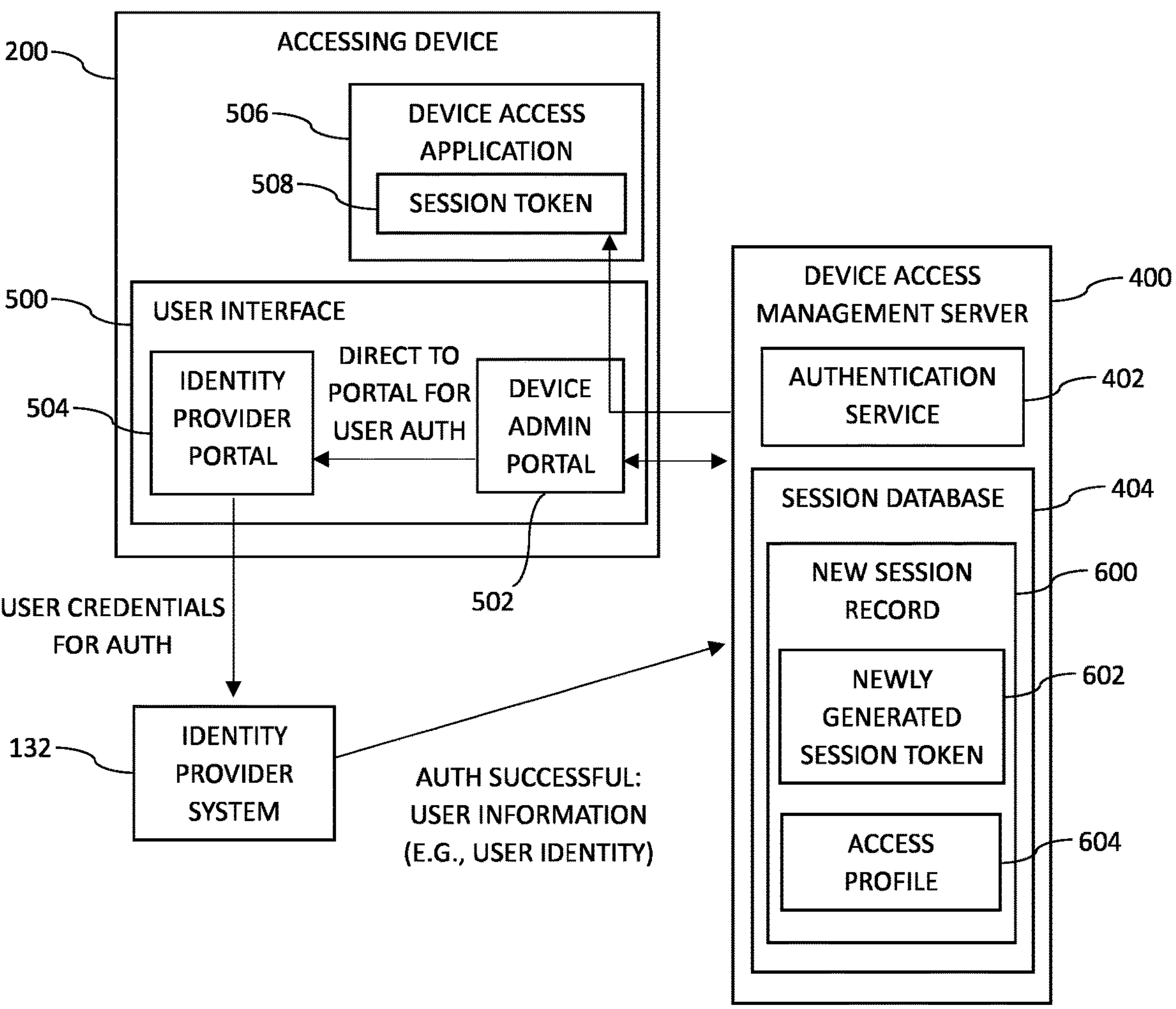
FIG. 6 is a diagram of illustrative communications for configuring the accessing device with a session-specific token in accordance with some embodiments.

FIG. 6 is a diagram of operations for generating and maintaining a session token and preparing an accessing device for requesting remote access to a target device. In the example of FIG. 6, accessing device 200 (e.g., an administrator device that is operable to access a remote target device for device administration) may open a device administration portal (application) from which accessing device 200 can communicate with one or more cloud-based services to enable device 200 to set up a secure connection with a target device (e.g., a network device to be administered by the network administrator). As one illustrative example, processing circuitry 204 on device 200 may execute (e.g., run) a web browser application configured to access web pages. Server 400 may supply content for device administration portal 502 to be provided on a particular web page (e.g., accessible via a web address supplied by user input). In other words, device administration portal 502 may be hosted by server 400. Accordingly, configurations in which server 400 communicates with portal 502 at device 200 via a Hypertext Transfer Protocol (HTTP), or more specifically a secure Hypertext Transfer Protocol (e.g., Hypertext Transfer Protocol Secure (HTTPS)) are sometimes described herein as an illustrative example. If desired, device administration portal 502 may be provided at device 200 in other manners (e.g., run on processing circuitry 204 as a local application installed on device 200).

Server 400 may interact with (e.g., supply user output to and/or receive user input from) a user through device administration portal 502 at device 200. As part of the services provided by server 400, server 400 may present one or more options or other prompts for user input (e.g., as part of the content presented by user interface 500 for portal 502) that enable a user to supply input such as an indication to initialize a device administration operation or other types of operations that require access to a remote target device through a secure communication session. Server 400 may receive the indication (and/or other user input) and respond by prompting the user to take further actions (e.g., to perform user identity authentication), by causing device 200 to install a target device access application through which device 200 accesses the target device, and/or by taking other actions. In one illustrative arrangement described herein as an example, a user may initiate a remote target device access operation on portal 502 (e.g., as part of a device administration operation). Upon initiation of such an operation, server 400 may receive the user request to initiate the remote target device access operation. Responsive to the request, server 400 may determine whether or not user identity of the user operating device 200 has been successfully authenticated.

Based on determining user authentication is desired (e.g., the user identity has not yet been authenticated, previous authentication of user identity has expired, and/or other criteria), server 400 may instruct device 200 to provide a user authentication portal from which a user authentication service is accessible to facilitate user authentication. In particular, server 400 may facilitate the opening of an identity provider portal 504 to perform user identity authentication. In the example of device administration portal 502 being accessed via a web browser application, server 400 may instruct (based on a request for redirection from server 400) the web browser application to access identity provider portal 504 (e.g., a web page of identity provider portal 504 hosted by identity provider system 132). In particular, the request for redirection may include a web address for identity provider portal 504 and the web browser application may open the web page associated with the web address to access identity provider portal 504. If desired, identity provider portal 504 may be provided at device 200 in other manners (e.g., run on processing circuitry 204 as a local application installed on device 200) and the request to open identity provider portal 504 may generally initiate a user identity authentication operation for the user (e.g., to be completed via user interface 500).

Identity provider system 132 may interface with (e.g., supply user input to and/or receive user input from) a user through identity provider portal 504 at device 200. Identity provider system 132 may be provided on server equipment (e.g., the types of server equipment described in connection with server equipment 102 in FIG. 1). In other words, the user identity authentication service(s) provided by identity provider system 132 may be hosted on the server equipment and accessible via portal 504 which communicates with the server equipment via HTTP, or more specifically HTTPS.

As part of the service(s) provided by identity provider system 132, server equipment implementing system 132 may present one or more options or other prompts for user input (e.g., as part of the content presented by user interface 500 for portal 504) that enable a user to supply input such as user-identifying information or other user information for authentication. In particular, the server equipment for 132 may receive user (login) credentials (e.g., a username, a password, answer(s) to challenge question(s), code(s) for multi-factor authentication, etc.) as user input via identity provider portal 504. The server equipment for system 132 may validate the user credentials received from identity provider portal 504 as input via user interface 500.

Based on validating the user credentials, the server equipment for system 132 may authenticate the user identity (of the user of device 200) as indicated by the user credentials. As part of this user identity authentication operation, the server equipment for system 132 may determine whether or not the user credentials are indicative of an active user (e.g., whether user credentials have are expired and/or are part of a database of active users) and/or determining user network privileges (e.g., whether user credentials are associated with a user having network administrator privileges and the level and/or extent of privileges), as just a few examples.

Based on successfully authenticating the user identity associated with the received user credentials (e.g., by validating the user credentials), the server equipment for system 132 may provide an indication of successful user authentication (e.g., in the form of one or more messages) to server 400. The indication of successful user authentication may include user access profile information (e.g., user identity information such as a user role within an organization, a level of network administrator access, network portions the user is authorized to access, types of devices the user is authorized to access, types of services the user is authorized to access, etc.) and/or other user contextual information (e.g., user information indicative of the user access profile). The one or more messages indicative of successful user authentication may be conveyed from the server equipment for system 132 to server 400 in any suitable manner (e.g., server 400 and system 132 may include respective software and hardware interfaces to facilitate communication therebetween). If desired, communication (e.g., of one or more messages indicative of successful user authentication) between server equipment for system 132 to server 400 may be conveyed via intervening device 200 (e.g., via portals 502 and 504 executing thereon).

Based on receiving the indication of the user identity of accessing device 200 being authenticated, the processing circuitry of server 400 (e.g., compute devices 104) may update session database 404 (e.g., stored on one or more storage devices 106) to include a corresponding new session record 600 (e.g., as one of session records 406 in FIGS. 4 and 5) in preparation for an authorized session to be established between accessing device 200 and target device 210. The processing circuitry of server 400 may generate a new session token such as session token 602 associated with record 600. In particular, session token 602 may be (e.g., serve as) a session identifier that uniquely identifies the session (record), a session key used to lookup the corresponding session (record) in database 404, a session passcode or cryptographic value (e.g., for encrypting traffic), and/or a value that serves one or more other functions. In illustrative configurations described herein, the processing circuitry of server 400 (e.g., executing authentication service 402) may use session token 602 (e.g., a received version of session token 602) to identity record 600 out of many records 406 within database 404, e.g., using one or more comparison or matching operations, using a lookup operation where the received version of session token 602 serves as the key, etc.

As part of generating new session record 600, the processing circuitry of server 400 may store, in record 600, session information such as an access profile 604 of the user whose identity was authenticated and/or other types of session information. The information in access profile 604 and/or other types of session information in record 600 may include user access profile information indicative of network and/or device administration privileges on the network (e.g., types of devices accessible to the user for device administration, network portions accessible to the user for device administration, etc.), specific information about whether or not the user is authorized to access the specific target device, role information of the user within an organization (e.g., a network administrator, a non-administrator employee, a user department within the organization, etc.), information indicative of the user identity of the accessing device, and/or other contextual information about the session being established, about the accessing device, or about the user of the accessing device.

In configurations described herein as an illustrative example, server 400 may receive the access profile information and/or other types of session (or user) information from identity provider system 132 (e.g., as part of the one or more message indicating successful user authentication). If desired, server 400 may receive these types of information from other sources (e.g., other supplemental equipment 124) and/or may derive the access profile information and/or other types of session (or user) information based on the user and/or device contextual information received from identity provider system 132 or other sources.

To enable accessing device 200 to request establishment of the session with target device 210 using session token 602 for authentication, server 400 may convey session token 602 to device 200 for use in such a request. In particular, server 400 may convey session token 602 via device administration portal 502 to accessing device 200. Device 200 may store (e.g., on memory circuitry 206) the session token received from server 400 as session token 508 (e.g., the same as session token 602 stored at server 400).

Additionally, to enable accessing device 200 to request establishment of the session with target device 210, server 400 may provide accessing device 200 with an installation file (via portal 502) for installing target device access application 506 onto device 200. In other words, device 200 may download and install target device access application 506 through which device 200 establishes (e.g., requests) a secure communication session to obtain (administrator) access to target device 210. In particular, session token 508 may be stored at a location on device 200 (e.g., memory circuitry 206 in FIG. 2) that is accessible by device access application 506.

Figure 7:
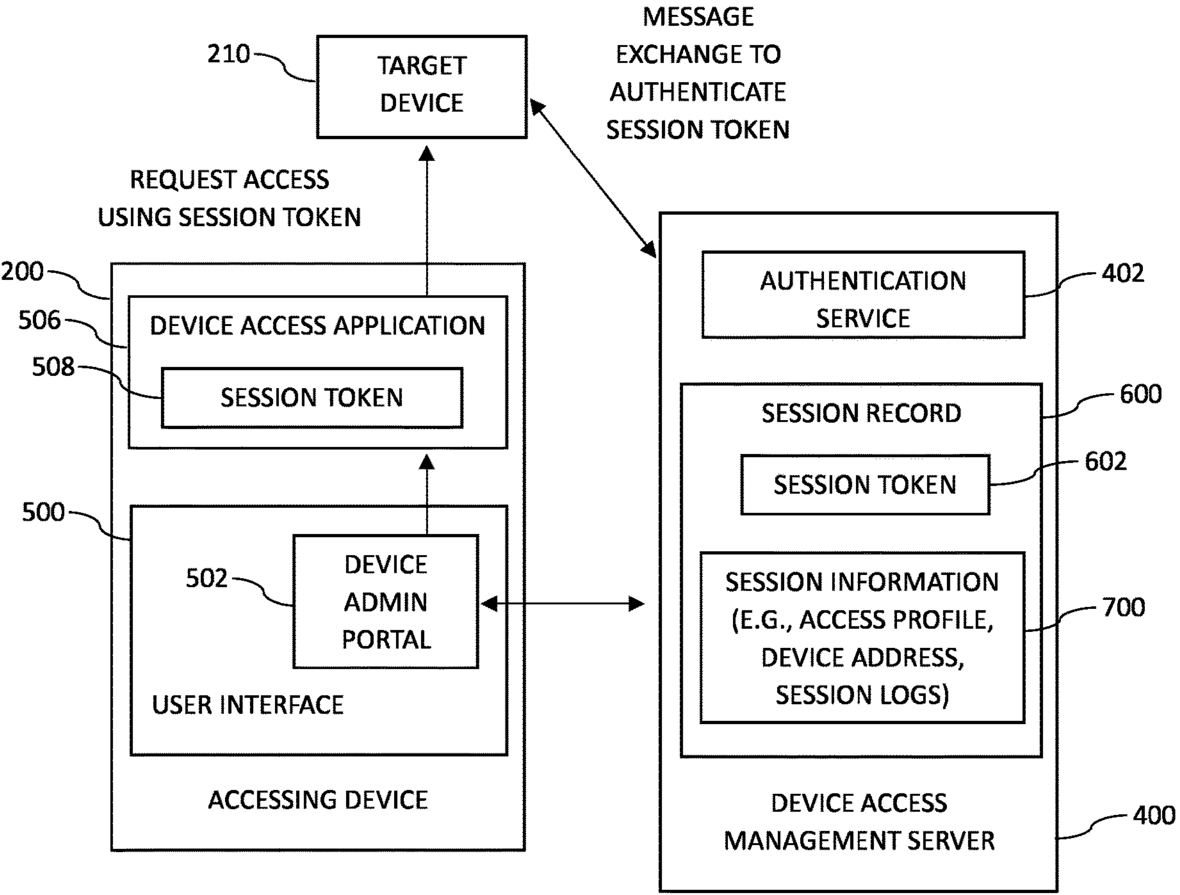
FIG. 7 is a diagram of illustrative communications for requesting secure target device access with a session-specific token in accordance with some embodiments.

FIG. 7 is a diagram of illustrative operations for controlling a target device access application running on processing circuitry of an accessing device to use a session token to request access to a target device and for authenticating the session token. In configurations described herein as an illustrative example, the operations described in connection with FIG. 7 may occur after at least some (e.g., all) of the operations described in connection with FIG. 6 (e.g., after user identity of device 200 has been authenticated by system 132, after server 400 has generated session record 600 and the information therein, after server 400 has distributed the session token to device 200, after server 400 has provided device access application 506 to device 200 for installation, after installation of device access application 506 by device 200 and/or after any other operations described in connection with FIG. 6).

In the example of FIG. 7, device administration portal 502 communicatively coupled to server 400 and executed on processing circuitry 204 of device 200 (e.g., as part of a web browser application) may receive user input to initiate a secure session with target device 210. Server 400 (based on the user input received at device administration portal 502) may cause (e.g., instruct and/or otherwise control) target device access application 506 to initiate a target device access operation. In particular, server 400 and/or the user may provide, via portal 502, target device address information (e.g., MAC address(es), IP address(es), and/or generally network address(es) of target device 210) to target device access application 506 running on processing circuitry 204 of device 200. Using the target device address information, device access application 506 may send one or more target device access request messages containing session token 508 for authentication and containing other message header information (e.g., target device address information, accessing device address information such as MAC address(es), IP address(es), and/or generally network address(es) of accessing device 200). The access request sent to target device 210 may request administrator access to target device 210 (e.g., to configure settings, to receive operation data, and/or to perform other networking functions with target device 210). The information for requesting access to target device 210 (e.g., in one or more access request messages) may be obtained based on user input to device administration portal 502 via user interface 500 and/or may be obtained from server 400.

After receiving the access request message containing session token 508, target device 210 may communicate with server 400 (e.g., authentication service 402 executing on the processing circuitry of server 400) to authenticate the received session token. In particular, authentication service 402 may receive the session token used by device 200 to authenticate access of target device 210. The session token may be sent, along with other information (e.g., address information) of accessing device 200 and/or target device 210) in an authentication request messages sent from device 210 to server 400. Authentication service 402 may identify a corresponding session record such as session record 600 associated with the received session token (e.g., which matches session token 602) that is stored on a database of active session records maintained on memory circuitry of server 400 (e.g., database 404 in FIGS. 4-6). As examples, authentication service 402 may perform one or more lookup operations with the database of active session records using the obtained session token as the key for the lookup operations, may perform one or more comparison operations between the obtained session token and session tokens stored in the database of active session records, and/or may use other search operations to identify any matching session token (matching session token 602) and any associated session record (e.g., record 600).

Authentication service 402 (e.g., the processing circuitry of server 400) may convey an indication of successful session token authentication (e.g., one or more response messages) to target device 210. The indication may include session information such as session information 700 stored as part of session record 600. In some illustrative configurations described herein as an example, the one or more response messages may include an access profile associated with the user identity such as a level of network administrator access (e.g., network and/or device administration privileges), one or more network portions that can be accessed by the user, one or more network device types that can be accessed by the user, whether target 210 should grant access to the user of device 200, etc.

In the example of FIG. 7, stored session information 700 may include other illustrative examples of session information 700 such as accessing device address information, target device address information, session logs (e.g., indicative of activities of device 200, device 210, and/or server 400), user identity authentication information (e.g., the mechanism by which user identity was authenticated, validity time period, etc.), and/or other suitable session or user information gathered by server 400 (e.g., from identity provider system 132 and/or other systems such as those described in connection with supplemental equipment 124 in FIG. 1). If desired, at least some (e.g., all) of these types of information may be presented to a user via user interface 500 (e.g., presented by default on a web page of portal 502, presented on a web page of portal 502 in response to user input such as one or more requests received at portal 502 to display corresponding information, etc.).

Figure 8:
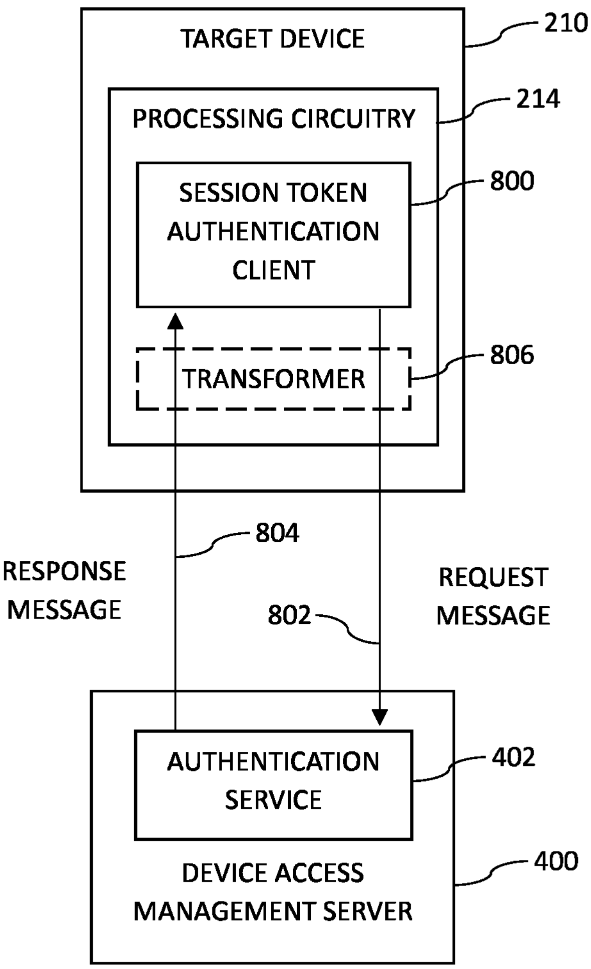
FIG. 8 is a diagram of illustrative communications for authenticating a session-specific token in accordance with some embodiments.

As described in connection with FIG. 7, target device 210 and server 400 may exchange messages to authenticate the session token used by device 200 to request access to device 210. FIG. 8 shows different illustrative schemes for communicating messages between a target device and a device access management server.

In the example of FIG. 8, processing circuitry 214 of device 210 may execute a session token authentication client (application) such as session token authentication client 800. To initiate the session token authentication process, client 800 may first send a request message such as message 802 that contains the session token (e.g., as extracted from a request message from device 200). In addition to the session token, message 802 may also include information about device 200 (e.g., address information, an identifier of the accessing device, a type of accessing device, etc.), information about device 210 (e.g., address information, an identifier of the accessing device, a type of accessing device, etc.) Authentication service 402 (e.g., executing on the processing circuitry of server 400) may receive request message 802.

Responsive to request message 802, authentication server 402 may send a response message such as message 804 back to session token authentication client 800 at target device 210. As described in connection with FIG. 7, response message 804 may be part of an indication to target device 210 that the session token has been successfully validated by service 402 and may include session information such as an access profile of the user of device 200 and/or other types of session information as described in FIGS. 4-7. In other instances (e.g., where the session token was not authenticated), message 804 may be indicative of a failure to authenticate the session token and device 210 may consequently deny device 200's request for access (e.g., by taking no action to further target device access).

In a first illustrative configuration, session token authentication client 800 and authentication service 402 may exchange messages based on a RADIUS protocol (e.g., a RadSec protocol). In a second illustrative configuration, session token authentication client 800 may be configured to exchange messages based on a Terminal Access Controller Access-Control System (TACACS) protocol (e.g., a TACACS Plus or TACACS+ protocol). In scenarios in which a TACACS protocol is used, device 210 and server 400 may be unable to directly convey messages based on a TACACS protocol (e.g., because the TACACS protocol does not provide a secure mechanism for message exchange therebetween). As such, in this second illustrative configuration, an intervening transformer 806 may be provided between session token authentication client 800 and authentication service 402. Transformer 806 (sometimes referred to as converter 806 or translator 806) may include interface and conversion circuitry that receives TACACS-protocol-based messages from client 800 and converts the received message (s) for transport to server 400 (e.g., service 402 implemented thereon) via a HTTPS protocol. Transformer 806 may include interface and conversion circuitry that receives messages via a HTTPS protocol from server 400 (e.g., service 402 implemented thereon) and converts the received messages to TACACS-protocol-based messages for conveyance to client 800.

The example of FIG. 8 in which target device 210 and/or processing circuitry 214 implement transformer 806 internally is merely illustrative. If desired, transformer 806 may be implemented on a device external to target device 210 and between target device 210 and server 400 (e.g., on the processing circuitry of the external device).

Figure 9:
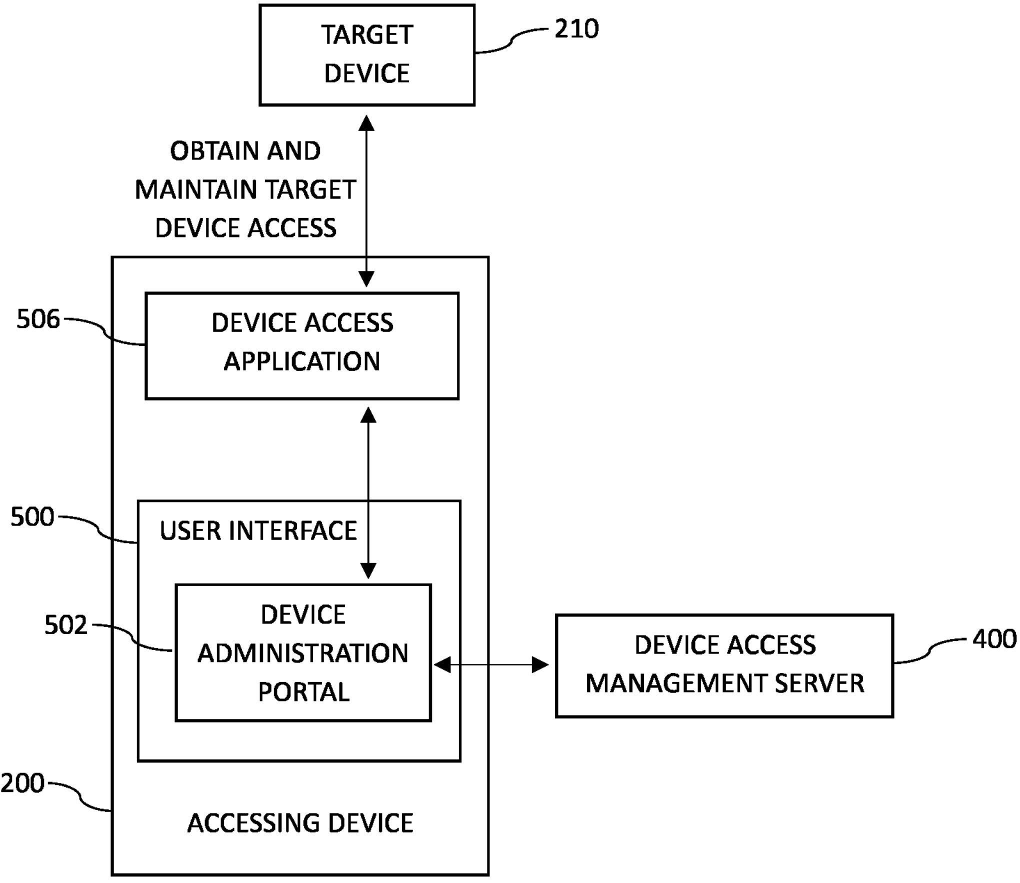
FIG. 9 is a diagram of illustrative communications for obtaining and maintaining target device access in accordance with some embodiments.

FIG. 9 is a diagram of illustrative operations for maintaining a communication session for accessing a target device. In configurations described herein as an illustrative example, the operations described in connection with FIG. 9 may occur after at least some (e.g., all) of the operations described in connection with FIGS. 6 and/or 7.

In the example of FIG. 9, the remote target device access may be provided by the combination of device administration portal 502 and device access application 506. In such a manner, a connection between accessing device 200 to server 400 by way of portal 502 is needed (at least in some illustrative arrangements described herein as an example) to maintain the secure communication session for accessing target device 210 from device 200. In particular, in this arrangement, a user may interact with device administration portal 502 (and consequently server 400) via user interface 500 to access target device 210 (e.g., to perform device administration). Server 400 (through device administration portal 502) may interact with device access application 506 (e.g., by providing commands, data, and other input) via application programming interface(s), as an example. Device access application 506 may in turn convey any input received from portal 502 (e.g., as user input and/or from server 400) to target device 210 (e.g., to perform device administration).

Configured in this manner, a user (e.g., a network administrator) operating accessing device 200 may perform any desired functions (e.g., relating to the device administration of target device 210) through portal 502 (e.g., using one or more web pages associated with portal 502 on a web browser application, and supply user input and receive user output using the one or more web pages of portal 502). Server 400 may facilitate the device administration of device 210 by hosting content of device administration portal 502 and, through portal 502, controlling the operation of portal 506 to set up and maintain the communication session to target device 210. This may serve to simplify secure remote access of target device 210 (e.g., by minimizing direct user interaction with device access application 506).

Figure 10:
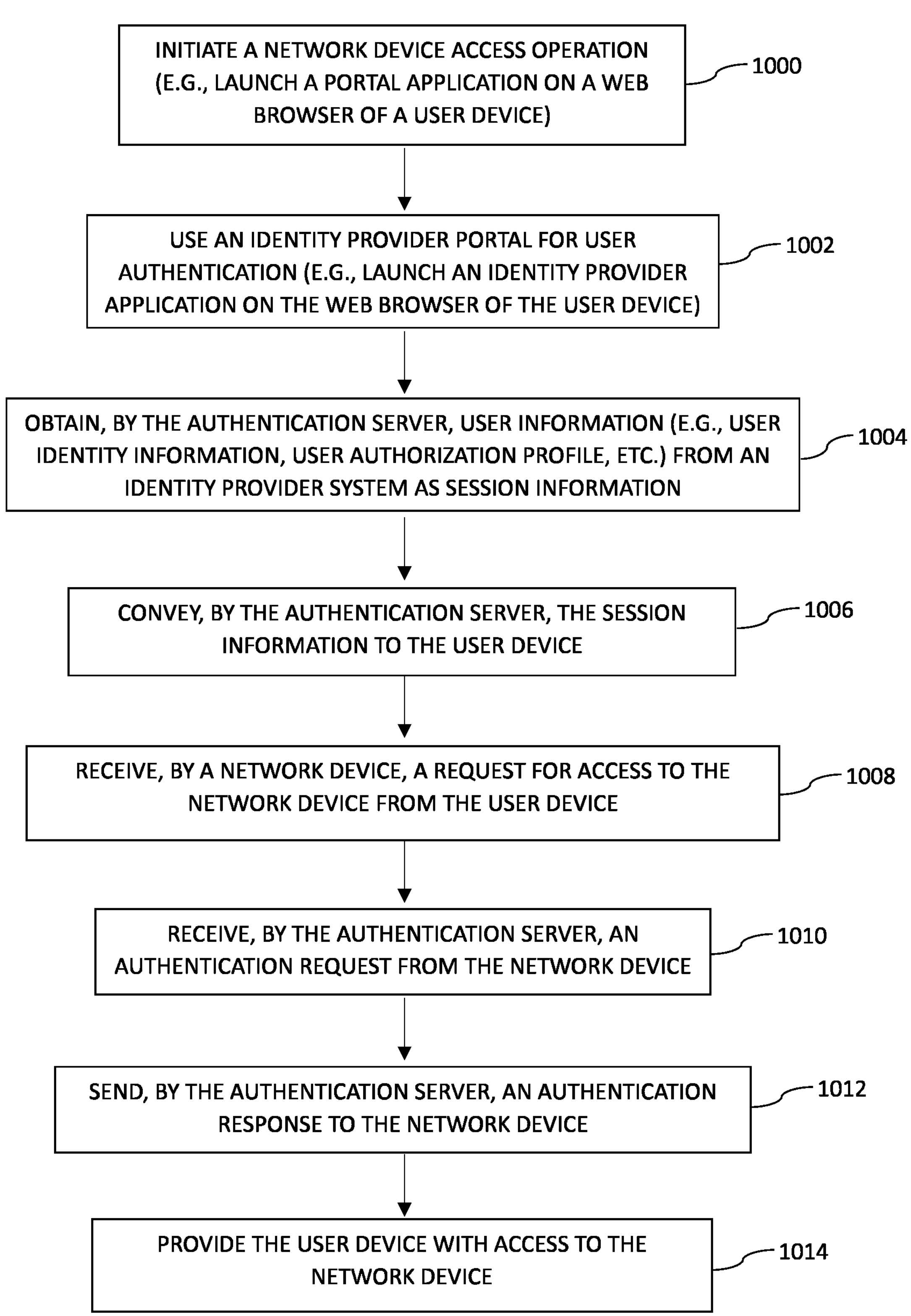
FIG. 10 is a flowchart of illustrative operations for obtaining secure access to a network device in accordance with some embodiments.

FIG. 10 is a flowchart of illustrative operations for operating a networking system to facilitate access to a target network device by an accessing user device using a session-specific token. As an example, the operations described in connection with FIG. 10 may be performed with the networking system of FIG. 1 or more specifically the networking system of FIG. 5 containing device 200, device 210, server 400, and system 132.

These operations may be performed by one or more processors of these different elements of a networking system. As examples, these operations may be performed with the processing circuitry of server 100 in FIG. 1 implemented using compute devices 104 or more specifically the processing circuitry of server 400 in FIG. 5 (which may be implemented as part of server 100), processing circuitry 204 of accessing device 200 in FIG. 2, and/or processing circuitry 214 of target device 210 in FIG. 2. The illustrative operations described in connection with FIG. 10 may generally be performed by the corresponding processing circuitry of the device or system (e.g., compute devices 104 or corresponding compute devices of server 400 (if implemented separately from server 100), processing circuitry 204, and processing circuitry 214) by executing software instructions stored on the corresponding memory circuitry of the device or system (e.g., storage devices 106 or corresponding storage devices of server 400 (if implemented separately from server 100), memory circuitry 206, and memory circuitry 216). If desired, one or more operations described in connection with FIG. 10 may be performed by other dedicated hardware components in server 100 or server 400, device 200, and/or device 210. In an illustrative configuration described herein as an example, the operations described in connection with FIG. 10 may be performed by elements of the networking system in FIG. 5. If desired, these operations may be performed by elements in other types of networking systems.

At block 1000, an accessing user device (e.g., an administrator device 118 in FIG. 1 serving as device 200 in FIGS. 2, 5-7, and 9) may initiate a target network device access operation to establish a communication session with the target network device. Configurations in which the user device launches a portal application on a web browser application (e.g., to communicate with a device access management server, sometimes referred to as an authentication server) based on user input received via a user interface at the user device are sometimes described herein as an illustrative example. As part of the network device access operation, the user input received by the user device may be received at a device administration portal (e.g., portal 502) and consequently conveyed to server 400 (hosting the device administration portal) to initiate the network device access operation.

At block 1002, the authentication server (e.g., server 400), through the portal application on the user device, may cause the user device to launch a user authentication application (e.g., a portal application for authenticating user identity). The user device may use a user authentication portal (e.g., identity provider portal 502) to communicate with a user authentication system such as an identity provider system to perform user authentication. As an example, the user device may launch an identity provider application on the web browser application to access a web page of the identity provider portal through which the user device may communicate with an identity provider server (e.g., hosting the identity provider portal).

At block 1004, the authentication server (e.g., compute devices forming the processing circuitry of the server) may obtain, from the identity provider server, user information such as user identity information, user authorization profile information (sometimes referred to herein as access profile information or user access profile information), and/or other information indicative of user device access for device administration. These types of user information may be stored by the authentication server as session information (e.g., in session records of session database 404 in FIG. 4).

At block 1006, the authentication server (e.g., the processing circuitry of the server) may convey (at least some of) the session information to the user device. As illustrative examples described herein, the authentication server may at least convey a session token with which the user device requests access to the network device.

At block 1008, the network device may receive a request for access to the network device sent from the user device. In particular, the processing circuitry of the user device may execute a target device access application, which accesses a stored session token (e.g., obtained from the authentication server in block 1006). Accordingly, the request for access may include a message that contains the session token generated and sent by the device access application to the network device. In some illustrative arrangements described herein as an example, a device administration portal hosted by the authentication server and executing on the processing circuitry of the user device, upon receiving corresponding user input to perform network device access, may cause the device access application to send the message to the network device.

At block 1010, the authentication server may receive a (session token) authentication request sent from the network device (e.g., based on the request for access received from the user device). In particular, an authentication service executing on the processing circuitry of the server may determine the validity of or otherwise authenticate the received session token. As an example, the authentication service may store session records each associated with a corresponding session token within a database on one or more storage devices. The authentication service may identify a session record in the database that contains the matching session token (e.g., that matches the received session token) and/or that is otherwise associated with the received session token.

At block 1012, the authentication server may send a (session token) authentication response to the network device. If the authentication service successfully authenticates the session token received in the authentication request from the network device, the authentication response may include user authorization or access profile information (e.g., obtained by the authentication server at block 1004) and/or other types of session information (e.g., session information 410 in FIG. 4). The message type of the response message and/or the types of information contained therein may be indicative of the user device being successfully authenticated and access to the target device should be granted to the user device.

At block 1014, the network device may provide the user device with access to the network device (e.g., for device administration) based on one or more messages received from the authentication server containing the indication that the session token, the user device access of the network device, and/or the user device has been authenticated. The network device may establish a secure communications session with the user device through which the network device can be administered.

The operations described in connection with FIG. 10 are merely illustrative. If desired, one or more these operations within FIG. 10 may be omitted and/or changed. If desired, one or more additional operations may be performed in addition to the operations described in connection with FIG. 10. If desired, the order of the operations described in connection with FIG. 10 may be changed. If desired, some operations described in connection with each block of FIG. 10 may be performed in parallel with each other (e.g., across multiple components such as across multiple processors of device 200, device 210, and/or server 400) and/or some operations described in connection with each block of FIG. 10 may be performed sequentially (e.g., at a single component such as at a processor of device 200, at a processor of device 210, or at a processor of server 400, etc.).

The methods and operations described above in connection with FIGS. 1-10 may be performed by the components of one or more network devices, one or more computing devices, and/or one or more servers or other host equipment using software, firmware, and/or hardware (e.g., dedicated circuitry or hardware). Software code for performing these operations may be stored on one or more non-transitory computer-readable storage media (e.g., tangible computer readable storage media) on one or more of the components of the network device(s), the computing device(s), and/or the server(s) or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s), the computing device(s) and/or the server(s) or other host equipment (e.g., processing circuitry of device 200, processing circuitry of device 210, processing circuitry of server 400, etc.).

The foregoing is merely illustrative and various modifications can be made to the described embodiments. The foregoing embodiments may be implemented individually or in any combination.

What is claimed is:

1. A method for facilitating access to a target device by an accessing device, the method comprising:

providing, by a server, a device administration portal at a web browser application of the accessing device;

providing, by the server, a device access application for installation at the accessing device;

providing, by the server and to the accessing device, a session token based on an indication of successful user authentication by the accessing device;

based on a target device access request received at the device administration portal, instructing the device access application to connect to the target device by using the session token to establish a communication session with the target device; and receiving, by the server and from the target device, an authentication request containing the session token used to connect to the target device, wherein the target device is a network device configured to forward network traffic between host devices and wherein the device access application is configured to perform device administration of the network device by supplying the network device with configuration data via the communication session.

2. The method defined in claim 1, wherein the accessing device comprises a computing device implementing a user interface configured to receive user input and supply user output.

3. The method defined in claim 1 further comprising:

generating, by the server, the session token in response to the indication of successful user authentication by the accessing device, wherein the session token is unique to the communication session.

4. The method defined in claim 1 further comprising:

receiving, by the server and from an identity provider system, the indication of successful user authentication by the accessing device; and receiving, by the server and from the identity provider system, user identity information indicative of user network privilege information.

5. The method defined in claim 4, wherein the identity provider system comprises an identity provider server that stores user records containing user credentials of users and corresponding user identity information for the users.

6. The method defined in claim 4 further comprising:

storing, by the server, a session record containing the session token and the received user identity information.

7. The method defined in claim 1 further comprising:

authenticating, by the server, the session token in the received authentication request to facilitate access to the target device by the accessing device.

8. The method defined in claim 1 further comprising:

storing, by the server, a database of session records;

identifying, by the server, a given session record out of the session records in the database using the session token contained in the received authentication request; and sending, by the server and to the target device, an authentication response containing a user access profile identified in the given session record.

9. The method defined in claim 8, wherein the authentication request and the authentication response comprise messages based on a secure Remote Authentication Dial-In User Service protocol.

10. The method defined in claim 8, wherein the authentication request and the authentication response comprise messages based on a secure Hypertext Transfer Protocol.

11. The method defined in claim 1 further comprising:

maintaining, by the server, a connection to the accessing device to maintain the communication session.

12. One or more non-transitory computer-readable storage media comprising computer-executable instructions that, when executed by one or more processors for a server that authenticates access to a target device by an accessing device, cause the one or more processors to:

maintain a database of session records for sessions between corresponding pairs of devices;

receive an authentication request message containing a session-specific token for authentication from the target device, wherein the target device is a network device configured to forward network traffic between host devices;

authenticate the session-specific token in the received authentication request message based on a given session record in the database of session records, wherein the given session record identifies the session-specific token and is associated with a communication session between the accessing device and the network device; and send an authentication response message to the target device based on authenticating the session-specific token.

13. The one or more non-transitory computer-readable storage media defined in claim 12 further comprising computer-executable instructions that, when executed by the one or more processors, cause the one or more processors to:

generate the session-specific token in response to an indication of successful user identity authentication for a user of the accessing device; and store the session-specific token in the given session record in the database.

14. The one or more non-transitory computer-readable storage media defined in claim 13 further comprising computer-executable instructions that, when executed by the one or more processors, cause the one or more processors to:

obtain user identity information for the user from an identity provider system, wherein the indication of successful user identity authentication is received from the identity provider system; and store the user identity information in the given session record.

15. The one or more non-transitory computer-readable storage media defined in claim 12, wherein the accessing device is an administrator computing device and wherein the session-specific token is unique to the communication session between the accessing device and the network device.

16. A method of operating a network device being accessed for device administration, the method comprising:

receiving, by the network device and from an accessing device, an access request that requests device access to the network device, the access request containing a session-specific key, wherein the network device is configured to forward network traffic between host devices;

sending, by the network device, an authentication request containing the session-specific key to a server configured to authenticate the session-specific key;

receiving, by the network device and from the server, an authentication response indicative of a result of authentication for the session-specific key;

connecting, by the network device via a communication session, to the accessing device based on the result indicating successful authentication; and providing, from the network device and via the communication session, operational data as output received by the accessing device.

17. The method defined in claim 16, wherein the authentication request and the authentication response comprise messages based on a secure Remote Authentication Dial-In User Service protocol.

18. The method defined in claim 16, wherein the authentication request and the authentication response comprise messages based on a secure Hypertext Transfer Protocol, the method further comprising:

converting, by the network device, between the messages based on the secure Hypertext Transfer Protocol and messages based on a Terminal Access Controller Access-Control System protocol.

19. The method defined in claim 16, wherein the session-specific key is unique to the communication session.

* * * * *